(12) United States Patent
Jiang et al.

(10) Patent No.: US 8,026,017 B2
(45) Date of Patent: Sep. 27, 2011

(54) HIGH VOLTAGE METHANOL FUEL CELL ASSEMBLY USING PROTON EXCHANGE MEMBRANES AND BASE/ACID ELECTROLYTES

(75) Inventors: Rongzhong Jiang, Olney, MD (US); Charles Rong, Venetia, PA (US); Deryn Chu, Potomac, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1011 days.

(21) Appl. No.: 11/723,174

(22) Filed: Mar. 16, 2007

(65) Prior Publication Data
US 2008/0226961 A1    Sep. 18, 2008

(51) Int. Cl.
*H01M 8/08* (2006.01)
(52) U.S. Cl. ........ 429/499; 429/492; 429/493; 429/494; 429/498; 429/500; 429/501
(58) Field of Classification Search ................. None
See application file for complete search history.

(56) References Cited

U.S. PATENT DOCUMENTS

| | | | |
|---|---|---|---|
| 4,311,771 A * | 1/1982 | Walther | 429/51 |
| 4,352,864 A * | 10/1982 | Struthers | 429/409 |
| 5,523,177 A | 6/1996 | Kosek et al. | |
| 5,599,638 A * | 2/1997 | Surampudi et al. | 429/494 |
| 6,319,923 B1 | 11/2001 | Dexter et al. | |
| 6,444,343 B1 | 9/2002 | Prakash et al. | |
| 6,607,858 B2 | 8/2003 | Wozniczka et al. | |
| 6,689,502 B2 | 2/2004 | Choi | |
| 6,733,914 B1 | 5/2004 | Grot et al. | |
| 6,746,793 B1 | 6/2004 | Gyoten et al. | |
| 6,780,893 B2 | 8/2004 | Sugaya et al. | |
| 6,814,865 B1 | 11/2004 | Aminabhavi et al. | |
| 6,815,111 B1 | 11/2004 | Yoshida | |
| 6,815,112 B2 | 11/2004 | Saito et al. | |
| 6,830,671 B2 | 12/2004 | Aritomi et al. | |
| 2004/0121227 A1 * | 6/2004 | Cheng et al. | 429/101 |
| 2007/0141456 A1 * | 6/2007 | Wang et al. | 429/144 |

* cited by examiner

*Primary Examiner* — Ula C. Ruddock
*Assistant Examiner* — Tony Chuo
(74) *Attorney, Agent, or Firm* — William V. Adams; Avrom David Spevack

(57) ABSTRACT

An electrolyte membrane assembly for use in a fuel cell or other electrochemical device includes an ion exchange membrane, a base electrolyte reservoir configured and operable to maintain a volume of a basic electrolyte solution in contact with at least some of the first face of the membrane, and an acid electrolyte reservoir configured and operable to maintain a volume of an acidic electrolyte in contact with at least a portion of the second face of the membrane. The membrane may be a cation exchange membrane or an anion exchange membrane. Also disclosed are fuel cells which incorporate the electrolyte membrane assembly.

5 Claims, 4 Drawing Sheets

HIGH VOLTAGE METHANOL FUEL CELL ASSEMBLY USING PROTON EXCHANGE MEMBRANES AND BASE/ACID ELECTROLYTES

GOVERNMENT INTEREST

The invention described herein may be manufactured, used, and licensed by or for the United States Government.

FIELD OF THE INVENTION

This invention relates generally to fuel cells. More specifically, the invention relates to an electrolyte membrane assembly for a fuel cell; and in specific instances, it relates to a direct methanol fuel cell which incorporates the electrolyte/membrane assembly.

BACKGROUND OF THE INVENTION

Fuel cells are highly efficient, silent, power generating systems in which a fuel undergoes an oxidative chemical reaction and generates electrical current. Fuel cells are coming into increasing use as power sources for a variety of fixed and mobile applications: including transportation systems; electronic devices: including computers, cellular phones, and specialized electronic equipment; and the like. Fuel cells are also being used as stationery power sources for communication installations, off-grid building power, and as backup power sources.

In a fuel cell, an oxidative reaction, typically oxidation of a fuel, occurs at a catalytic surface of a first electrode, and a reduction reaction, typically reduction of oxygen, occurs at a second electrode surface. The electrodes are separated, as for example, by a membrane which is ion permeable but has very low electron conductivity. In a cell of this type, an external circuit allows for the passage of electrons from one electrode to the other so as to balance the chemical reactions, and it is this flow of electrons which generates power. For reasons of simplicity, and material compatibility, most fuel cells presently in use utilize hydrogen as a fuel gas and air or oxygen as an oxidizer. Storage and delivery of the hydrogen fuel can complicate and limit the utility of such fuel cells. In order to overcome these problems, significant efforts have been extended to develop fuel cells running on liquid fuels, and methanol-fueled fuel cells, referred to also as direct methanol fuel cells (DMFC), have been developed.

In conventional direct methanol fuel cells of the type known in the art, methanol is oxidized at an anode, which is typically comprised of a body of electrically conductive material having a platinum-based catalyst thereupon. The anode reaction is as follows:

$CH_3OH + H_2O \rightarrow CO_2 + 6H^+ + 6e^-$  0.02V

In a cell of this type, the cathode reaction is as follows:

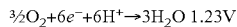
$\frac{3}{2}O_2 + 6e^- + 6H^+ \rightarrow 3H_2O$  1.23V

In a cell of this type, the anode and cathode are separated by an ion exchange membrane which allows protons generated in the anode reaction to pass therethrough to the cathode. The membrane does not permit the passage of electrons, and these flow through an external circuit to provide an output voltage. Membranes of the type typically used in such cells can include perfluorosulfonate materials such as those sold under the trademark Nafion by the DuPont Chemical Corporation. The theoretical potential difference in a cell in which the foregoing reactions take place is 1.21V. However, the practical cell voltage of such fuel cells is only 0.7V under open circuit conditions and 0.4V under typical operational discharge rates. This is because of the slow catalytic kinetic rate of methanol oxidation at the anode, and methanol cross-over from the anode to the cathode through the electrolyte membrane, which causes cathode-electrode depolarization. These phenomena are well known in the art.

From the foregoing, it will be appreciated that there is significant room for improvement in the field of direct methanol fuel cells. Any improvement which can increase the voltage of such cells will greatly enhance their utility by allowing more compact power sources to be implemented. As will be described in detail hereinbelow, the present invention concerns membrane assemblies for fuel cells which may be advantageously incorporated into a variety of fuel cells, including direct methanol (or other liquid fuel) fuel cells. The direct methanol fuel cells incorporating the assembly of the present invention are reliable, rugged, and operate at high-output voltages. These and other advantages will be apparent from the drawings, discussion and description which follow.

BRIEF DESCRIPTION OF THE INVENTION

Disclosed is an electrolyte/membrane assembly which may be used in an electrochemical device such as a fuel cell. The assembly includes an ion exchange membrane having opposed first and second faces, a base electrolyte reservoir configured and operable to maintain a volume of a basic electrolyte solution in contact with at least a portion of the first face of the membrane, and an acid electrolyte reservoir configured and operable to maintain a volume of an acidic electrolyte in contact with at least a portion of the second face of the membrane. The membrane may be a cation exchange membrane such as a proton exchange membrane, and one particular type of proton exchange membrane is a perfluorosulfonate polymer membrane. In other instances, the membrane may be an anion exchange membrane. The reservoirs may include basic electrolyte materials such as an alkaline metal hydroxide as well as acidic electrolytes such as an aqueous solution of phosphoric acid.

Further disclosed is a fuel cell which includes the electrolyte membrane assembly. The fuel cell will further include an anode which is disposed in a spaced-apart relationship with a first face of the membrane, a basic electrolyte solution disposed between the anode and the first face of the membrane, as well as a cathode disposed in a spaced-apart relationship with a second face of the membrane and having an acidic electrolyte disposed between it and the second face of the membrane. The fuel cell may further include a reservoir for a fuel. The reservoir is in operative communication with the anode. The fuel cell may further include an oxidizer reservoir in operative communication with a cathode. Further fuel cell structures such as current collectors, electrical leads, housings and the like may be used in combination with the foregoing fuel cell structure.

DETAILED DESCRIPTION OF THE INVENTION

The present invention, in one aspect, concerns an electrolyte membrane assembly for a fuel cell. In general, the assembly comprises an ion exchange membrane having differing electrolyte materials disposed at either face thereof. In particular, the assembly will include an ion exchange membrane, which may be an anion exchange membrane, or a cation exchange membrane. The assembly further includes a base electrolyte reservoir which is configured and operable to maintain a volume of a basic electrolyte solution in contact with at least a portion of a first face of the membrane. The assembly further includes an acid electrolyte reservoir configured and operable to maintain a volume of an acidic electrolyte in contact with at least a portion of the second face of the membrane. This assembly may be implemented in a variety of configurations, and FIGS. 1 and 2 show one such particular configuration.

Figure 1:
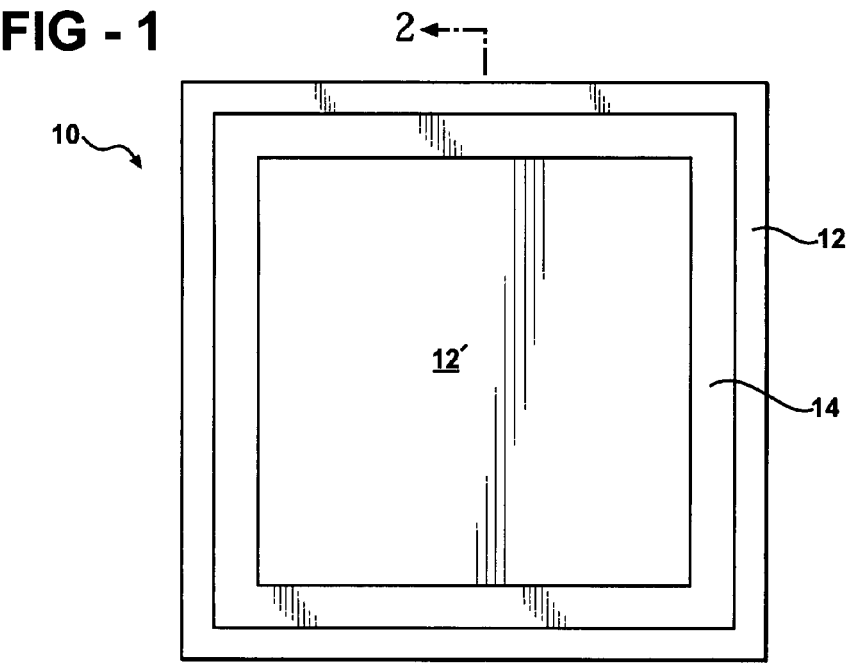
FIG. 1 is a front elevational view of an embodiment of an electrolyte membrane assembly.

Referring now to FIG. 1, there is shown a front elevational view of an electrolyte membrane assembly 10 which includes a membrane 12. As noted above, this membrane may be any one of a variety of membranes which are capable of allowing for the passage of an ionic current therethrough. As such, these membranes may be proton exchange membranes, such as perfluorosulfonates and the like, or they may be anion exchange membranes. As is known in the art, such membrane materials in some instances comprise polymers, while in other instances they may comprise ceramics; and in specific instances, the membranes may operate at elevated temperatures.

As is shown in FIG. 1, a first reservoir 14 is in contact with a portion of the membrane 12. This reservoir 14 is operative to contain an electrolyte material therein and to allow access of the electrolyte material to at least a portion of the membrane. As is shown in FIG. 1, a central portion of the assembly 10 exposes a section of the membrane 12' which has electrolyte in contact therewith. The reservoir 14 may include one or more openings therein which allow for replenishment and/or removal of electrolyte therefrom.

Figure 2:
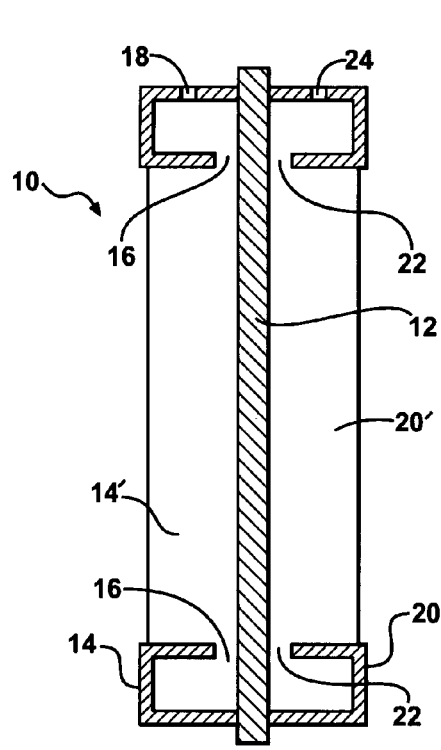
FIG. 2 is a cross-sectional view of the electrolyte membrane assembly of FIG. 1 taken along line 2-2.

Referring now to FIG. 2, there is shown a cross-sectional view of the electrolyte membrane assembly 10 of FIG. 1 taken along line 2-2. As we see from FIG. 2, a membrane 12, as described above, has a first reservoir 14 in contact with the first face thereof. As was apparent from FIG. 1, the reservoir is configured as a frame which surrounds a portion of the membrane. The frame portions of the reservoir are adapted and configured to retain a volume of electrolyte material therein; and is shown in the figure, opening 16 allows for fluid communication between the reservoir 14 and the portion of the face of the membrane 12. Also visible in FIG. 2 is the back wall portion of the reservoir 14'. From FIG. 2, it will be further seen that the reservoir 14 includes a filler opening 18 which allows for electrolyte to be filled thereinto.

A second reservoir 20 is disposed in contact with the opposite face of the membrane 12. This reservoir is generally similar to the first reservoir 14, and in that regard, includes openings 22 which allow for fluid communication between the reservoir and the membrane 12. Likewise, FIG. 2 shows the back wall 20' of the second reservoir 20, as well as a filler opening 24.

In a typical electrolyte membrane assembly of the type shown herein, the electrolytes will be acidic and basic solutions, and may be aqueous-based solutions, non-aqueous solutions, or mixed solutions of aqueous and non-aqueous materials. The reservoir should be fabricated from materials which are compatible with the electrolytes, and in most instances, synthetic polymeric materials will serve for this purpose.

It is to be understood that the reservoirs may be otherwise configured. For example, the reservoir may extend across a portion of the face of the membrane and as such, may comprise a grid or mesh-like member. In other instances, the reservoir may cover the entirety of the membrane, provided that the reservoir does not impede chemical reactions in the fuel cell. For example, the reservoir may comprise a sponge-like, or other bibulous body which retains a volume of electrolyte. Yet other variations and modifications will be apparent to those of skill in the art.

The electrolyte membrane assemblies in the present invention may be implemented into a variety of electrochemical cells wherein paired oxidation reduction reactions generate an electrical current. As mentioned above, these assemblies have specific utility in fuel cells, including direct methanol fuel cells. However, these assemblies may be utilized in other devices, such as metal/air batteries, which are to be considered to be a type of fuel cell within the context of this disclosure. While, as mentioned, the assemblies have very broad utility in electrochemical applications, they will be described with particular reference to a direct methanol fuel cell. However, it should be understood that this invention is not so limited, and one of skill in the art can readily implement the principles disclosed herein in a variety of devices.

Figure 3:
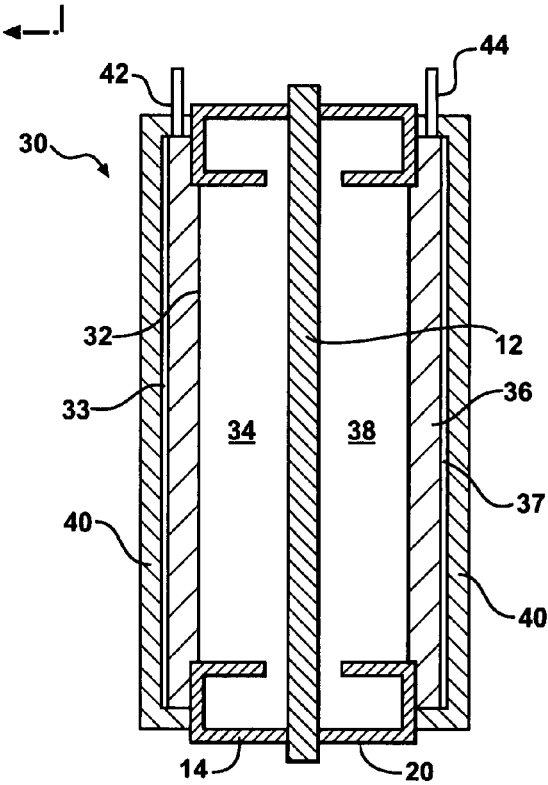
FIG. 3 is a cross-sectional view of a fuel cell incorporating the electrolyte membrane assembly of FIGS. 1-2.

Referring now to FIG. 3, there is shown a fuel cell 30 which incorporates the disclosed electrolyte membrane assembly. The cell 30 is, for purposes of illustration, described as being a direct methanol fuel cell. As discussed above, the electrolyte membrane assembly includes a membrane 12, a first reservoir 14, and a second reservoir 20. In the fuel cell of FIG. 3, an anode 32 is disposed in contact with the first reservoir 14. A volume of a basic electrolyte 34 is disposed in the first reservoir 14 and is maintained in contact with the membrane 12 and the anode 32. The concentrations and compositions of the electrolytes used in combination with the present electrolyte membrane assemblies are generally typical of those used in the art. Electrolyte concentrations of 5% to 60% (by weight) are typically utilized, and in particular instances, concentrations in the range of 30% to 40% by weight are utilized.

A cathode 36 is disposed in contact with the second reservoir 20, and an acidic electrolyte 38 is disposed in the space between the membrane and the cathode 36. As shown, a pair of endplates 40 seal the fuel cell.

As further shown in FIG. 3, a first conduit 42 is in communication with the anode 32, and a second conduit 44 is in communication with the cathode 36. These conduits 42, 44 may be used to lead an electrical current therefrom. In yet other instances, separate electrodes may be used for this purpose.

In the fuel cell 30 of FIG. 3, fuel is supplied to the anode 32, from a fuel reservoir 33, disposed between the anode 32 and endplate 40. This reservoir 33 may be in fluid communication with a fuel source (not shown). This source may comprise a tank or other such vessel. Likewise, the cathode 36 is supplied with air, or another such oxidizer from an oxidizer reservoir 37, disposed between the cathode 36 and endplate 40. This reservoir 37 may be in fluid communication with a source of an oxidizer (not shown), such as a pump, a tank, or the like.

In a fuel cell of this type, a cationic exchange membrane will allow only cations to pass therethrough, and block anions; conversely, an anionic exchange membrane will only allow anions to pass therethrough, blocking cations. The ion exchange membrane thus will be seen to block any unwanted ion transport through the cell. In this assembly, the base electrolyte will form a thin liquid layer between the anode and the ion exchange membrane and the acid electrolyte will form another thin layer between the cathode and the ion exchange membrane. A potential will build up between the interfaces of the membrane and this will eventually stop the continuation of such ion exchange and neutralization between the base and the acid. Therefore, the base-membrane-acid system can be stabilized for a long time. This combination of base-membrane-acid (referred to as a BMA-electrolyte assembly) is very useful in fuel cells and air batteries.

In those instances where the electrolyte membrane assembly is utilized in conjunction with a direct methanol fuel cell, electrode reactions will differ from those in a conventional, prior art fuel cell. The anode reaction will be as follows:

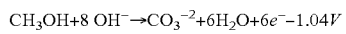

The cathode reaction will be as follows:

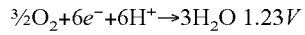

The theoretical potential difference between the anode and the cathode of a fuel cell of this type is 2.27V. Actual, experimental, open cell voltages measured for cells of this type is 2.0V, and operation voltage under typical discharge conditions is 1.4V. This high cell voltage is useful for achieving high power output when the cell is in discharge, and allows for the use of more compact cell structures.

An experimental series was carried out evaluating direct methanol fuel cells of the type described hereinabove. In this experimental series, the fuel cells were of the general configurations shown in FIG. 3. Perfluorosulfonate membrane material (Nafion 117, from the DuPont Corporation) was used as an exchange membrane. The basic electrolyte was an aqueous solution of 30% KOH, and the acid electrolyte was a 40% aqueous solution of $H_3PO_4$. The reservoirs were fabricated from a hard plastic, chemically stable, material. The cathode and anode electrodes were fabricated from carbon cloth obtained from E-Tek, Inc. The anode was coated with a catalyst of PtRu black and the cathode was coated with a catalyst of Pt black. Current collectors comprising titanium plates of approximately 0.7 mm thickness were affixed to each of the electrodes. The titanium plates included a number of small holes therethrough which allowed for passage of fuel, air and electrolyte. Endplates of a hard plastic material closed off the cell. Fuel for the cell comprised a 4 M concentration of methanol. Air was the oxidant. Performance of the fuel cell was evaluated using a battery test station manufactured by the Arbin Instruments Corporation.

In the first experiment, the discharge performance of the aforedescribed base membrane acid (BMA) membrane assembly direct methanol fuel cell (BMA-electrolyte DMFC) was compared with that of a conventional proton exchange membrane direct methanol fuel cell (PEM-DMFC). The prior art cell was fabricated in accord with the foregoing, except that a Nafion 117 membrane was substituted for the BMA assembly.

Figure 4:
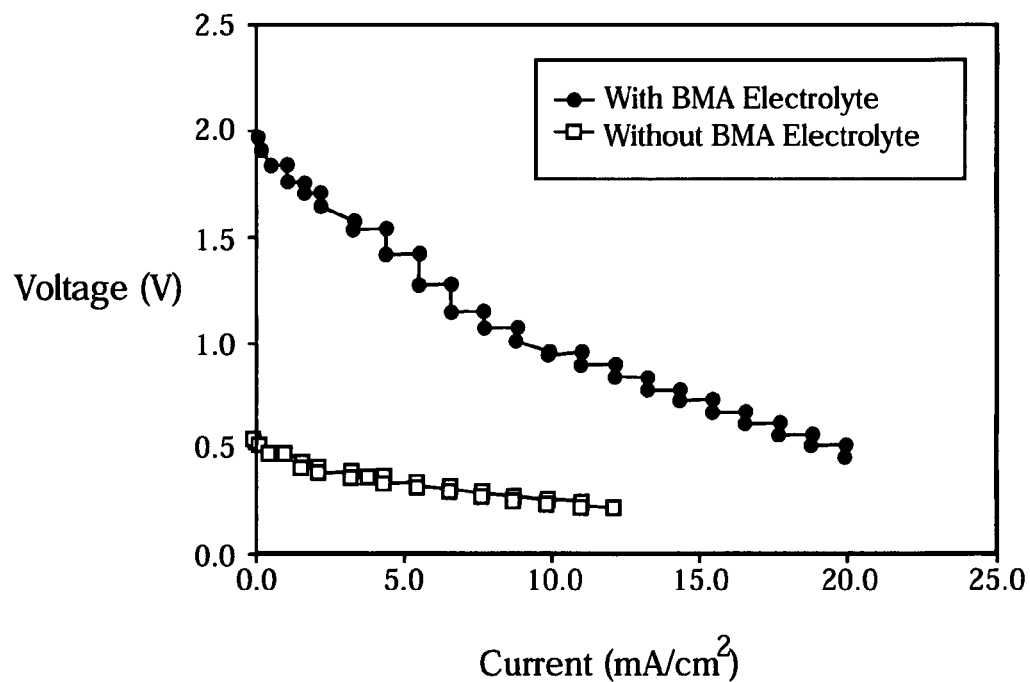
FIG. 4 is a graph showing the current/voltage characteristics of a first fuel cell which incorporates an electrolyte membrane assembly disclosed herein, and a second fuel cell which incorporates prior art membrane technology.

FIG. 4 shows the current/voltage characteristics of the two cells. As will be seen, the discharge current of the BMA-electrolyte DMFC cell commences at 2.0V, which is 1.4V higher than that of the prior art PEM-DMFC cell. With increasing discharge current, the voltages of both drop; but, at discharge currents of even 10 mA/cm² there is still 0.7V difference between the two.

Figure 5:
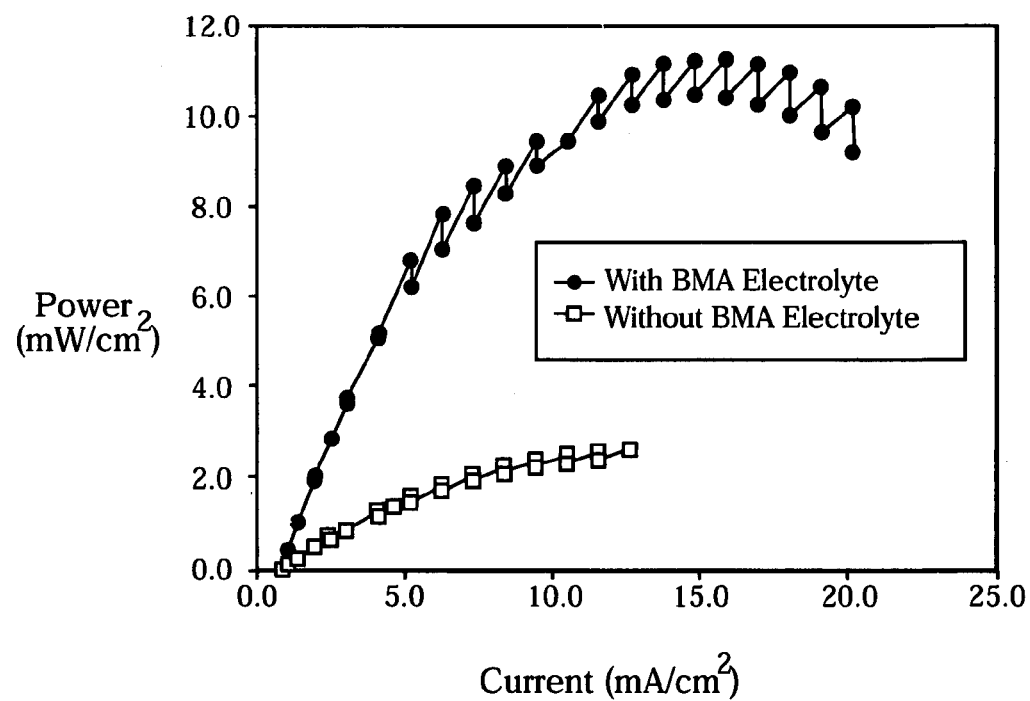
FIG. 5 is a graph showing the power/current curves of the cells of FIG. 4.
Figure 6:
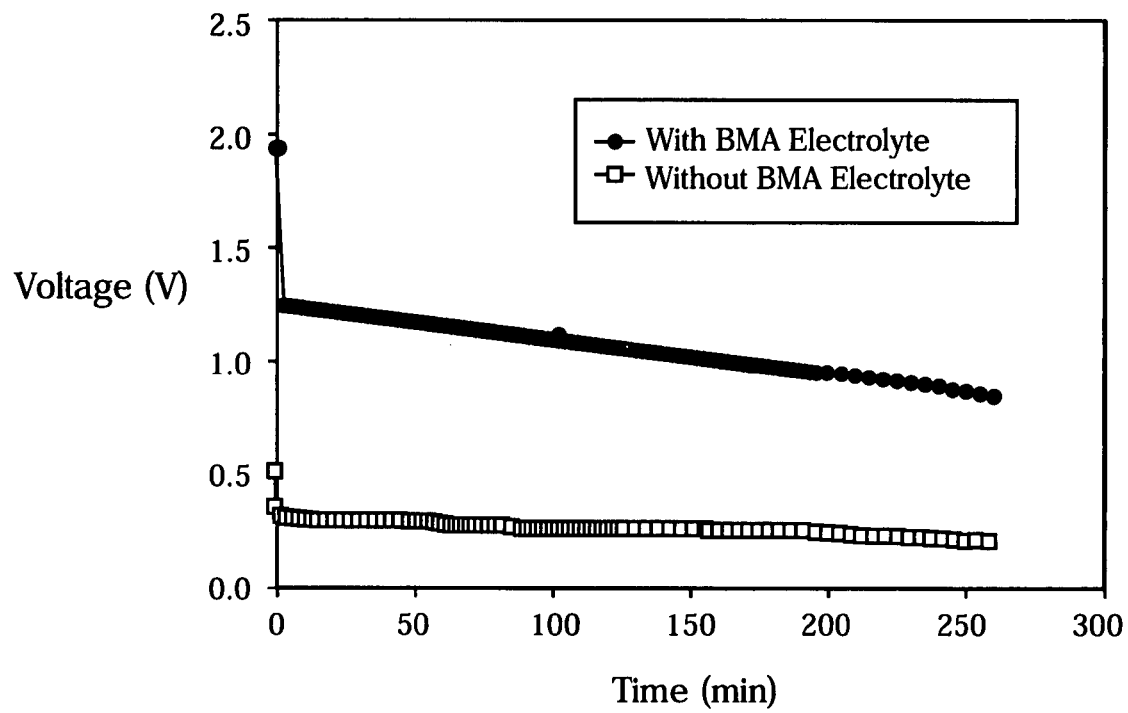
FIG. 6 is a graph showing the long term discharge performance of the cells of FIG. 4.

FIG. 5 shows the power-current curves of both cells. It will be seen that the peak power of the BMA-electrolyte DMFC is 11.0 mW/cm², which is four times higher than that of the PEM-DMFC of the prior art (2.6 mW/cm²). From the foregoing, it will be seen that the performance characteristics of the cell incorporating the present invention are significantly better than those of the prior art cells.

In a second experimental series, the long-term discharge performance of the BMA-electrolyte cell was compared with that of the prior art PEM-DMFC cells. In this experiment, both cells were discharged at a constant current of 45 mA for each 9 cm² cell which gave a current level of 5 mA/cm². As will be seen, the voltage of both cells decreases somewhat as the methanol is being consumed; however, the average discharge voltage of the BMA-electrolyte DMFC is about 0.8V more than that of the prior art PEM-DMFC.

Figure 7:
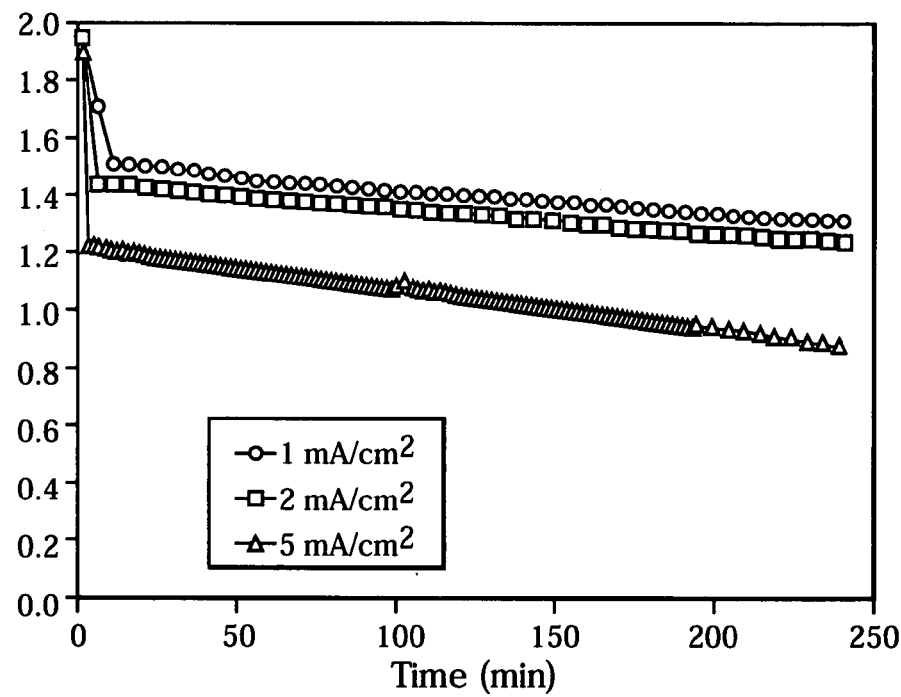
FIG. 7 is a graph showing the long term discharge characteristics of a cell incorporating the present electrode membrane assembly as a function of discharge rates.

In a further experiment of this series, the effect of discharge rate on the performance of the BMA-electrolyte DMFC cell was examined under constant current discharge at rates of 1, 2 and 5 mA/cm². This data is summarized in FIG. 7. As will be seen, the BMA-electrolyte DMFC shows very good discharge performances at all of the rates.

Figure 8:
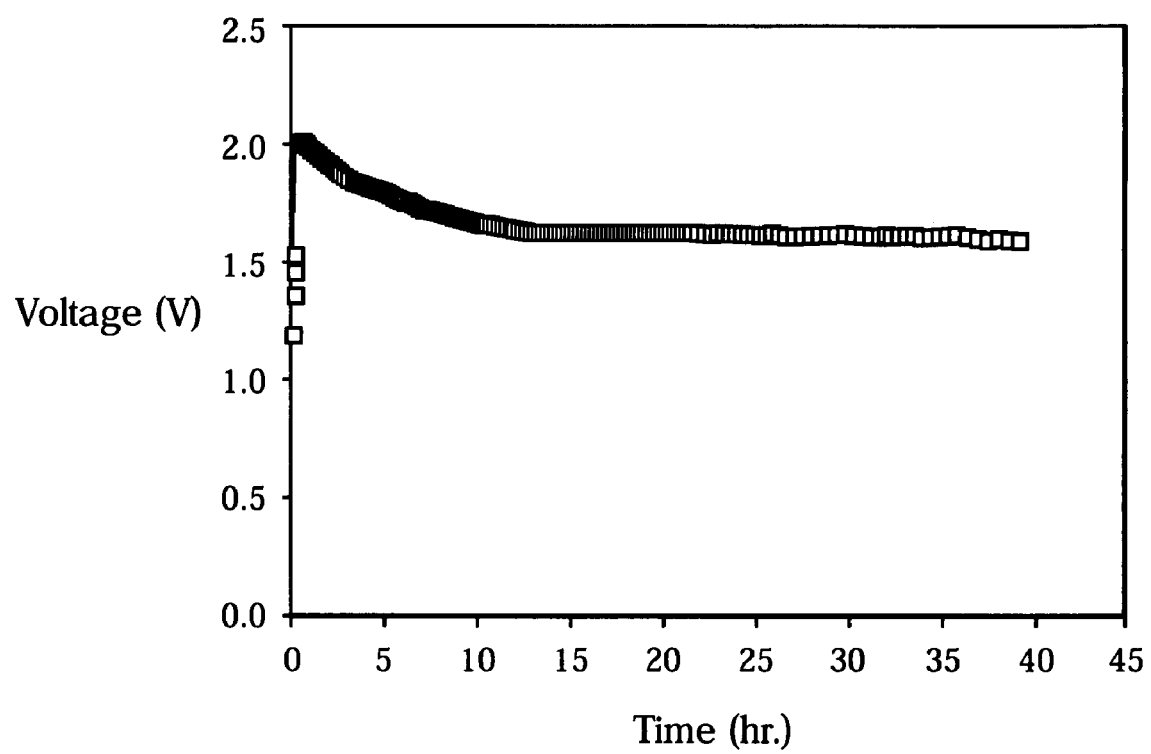
FIG. 8 is a graph showing the stability of a fuel cell incorporating the electrode membrane assembly.

In a further experimental series, the stability of the BMA-electrolyte DMFC was examined, under open circuit conditions over an extended period of time. The results thereof are summarized in FIG. 8, and it will be seen that there is a slight decrease in voltage during the first 10 hours because of methanol crossover from the anode to the cathode. Then, the voltage becomes stable at 1.6V during an extended period of at least 40 hours.

From the foregoing, it will be seen that the electrode membrane assembly of the present invention provides significant improvements in the performance characteristics of direct methanol fuel cells. Similar enhancements in performance will also be noted with regard to other fuel cell applications, including fuel cells operating on other liquid fuels, as well as fuel cells operating on solid or gaseous fuels. As noted above, metal air batteries are considered to be a type of fuel cell, and such electrochemical systems will also benefit from the membrane assembly disclosed herein.

In view of the foregoing, it is understood that numerous modifications and variations of this invention will be readily apparent to those of skill in the art. The foregoing drawings, discussion and description are illustrative of specific embodiments; but are not meant to be limitations upon the practice of this invention. It is the following claims, including equivalents, which define the scope of the invention.

The invention claimed is:

1. A fuel cell comprising:
   a single layer mono-polar ion exchange membrane having opposed first and second faces;
   a base electrolyte reservoir configured and operable to maintain a volume of a basic electrolyte solution in contact with at least a portion of said first face of said single layer membrane;
   an acid electrolyte reservoir configured and operable to maintain a volume of an acidic electrolyte in contact with at least a portion of said second face of said single layer membrane;
   an anode in spaced apart relationship with said first face of said membrane;

a basic electrolyte solution disposed between said anode and said first face of said membrane; said basic electrolyte solution comprising an alkali metal hydroxide;

a cathode in a spaced apart relationship with said second face of said membrane; and an acidic electrolyte disposed between said cathode and said second face of said membrane; said acidic electrolyte comprises phosphoric acid;

a fuel reservoir in operative communication with said anode, said reservoir being operable to deliver a fuel to the basic electrolyte disposed between said anode and said first face of said membrane;

an oxidizer reservoir in operative communication with said cathode, said reservoir being operable to deliver an oxidizer to the acidic electrolyte disposed between said cathode and said second face of said membrane;

a first current collector in electrical communication with said anode, and a second current collector in electrical communication with said cathode.

2. The fuel cell of claim 1, wherein said membrane comprises a proton exchange membrane.

3. The fuel cell of claim 2, wherein said proton exchange membrane comprises a perfluorosulfonate polymer.

4. The fuel cell of claim 1, wherein, in the operation of said fuel cell, said anode is operative to oxidize an alcohol.

5. The fuel cell of claim 1, wherein the weight concentration of the acidic electrolyte and the basic electrolyte are each, independently, in the range of 30% to 40%.

* * * * *